United States Patent
Freudenberg et al.

(10) Patent No.: US 10,636,163 B2
(45) Date of Patent: *Apr. 28, 2020

(54) ANALYZING IMAGES OF PESTS USING A MOBILE DEVICE APPLICATION

(71) Applicant: Ecolab USA Inc., St. Paul, MN (US)

(72) Inventors: Jared R. Freudenberg, Plymouth, MN (US); Christopher D. Diller, Bloomington, MN (US); Kevin S. Smyth, Woodbury, MN (US)

(73) Assignee: Ecolab USA Inc., Saint Paul, MN (US)

(*) Notice: Subject to any disclaimer, the term of this patent is extended or adjusted under 35 U.S.C. 154(b) by 0 days.

This patent is subject to a terminal disclaimer.

(21) Appl. No.: 16/505,656

(22) Filed: Jul. 8, 2019

(65) Prior Publication Data

US 2019/0333240 A1 Oct. 31, 2019

Related U.S. Application Data

(63) Continuation of application No. 15/472,828, filed on Mar. 29, 2017, now Pat. No. 10,395,384.

(Continued)

(51) Int. Cl.
*G06T 7/70* (2017.01)
*G06T 7/62* (2017.01)
(Continued)

(52) U.S. Cl.
CPC ............. *G06T 7/70* (2017.01); *A01M 1/026* (2013.01); *A01M 1/106* (2013.01); *A01M 1/14* (2013.01);
(Continued)

(58) Field of Classification Search
CPC ........ A01M 1/026; A01M 1/14; A01M 1/145; A01M 1/103; A01M 1/106; A01M 1/023;
(Continued)

(56) References Cited

U.S. PATENT DOCUMENTS 6,161,327 A 12/2000 Thomas
6,418,180 B1 7/2002 Weiss
(Continued)

FOREIGN PATENT DOCUMENTS

CA 2476932 C 3/2011
CN 201036307 Y 3/2008
(Continued)

OTHER PUBLICATIONS

International Patent Application No. PCT/US2017/024703, International Search Report and Written Opinion dated Jun. 29, 2017, 9 pages.

(Continued)

*Primary Examiner* — Michael S Osinski
(74) *Attorney, Agent, or Firm* — Fredrikson & Byron, P.A.

(57) ABSTRACT

Techniques for analyzing images of pests using a mobile device application are described. A mobile computing device may receive, via a graphical user interface (GUI), location information input corresponding to a location of a glueboard, an identification input of a pest type caught on the glueboard, and an image of the glueboard. The device may analyze white and dark areas of the image to determine at least one of: 1) total dark surface area of the glueboard and 2) number and size of multiple contiguous dark surface areas of the glueboard. The device may calculate a quantity of pests based on dark surface area and an average size of the pest. The device may output the quantity of pests to the GUI.

33 Claims, 11 Drawing Sheets

Related U.S. Application Data

(60) Provisional application No. 62/314,644, filed on Mar. 29, 2016.

(51) Int. Cl.

| | | |
|---|---|---|
| *G06T 7/11* | (2017.01) | |
| *A01M 1/02* | (2006.01) | |
| *G06K 9/62* | (2006.01) | |
| *A01M 1/10* | (2006.01) | |
| *A01M 1/14* | (2006.01) | |
| *G06F 3/0488* | (2013.01) | |
| *G06T 7/60* | (2017.01) | |
| *G06K 9/46* | (2006.01) | |

(52) U.S. Cl.
CPC ......... *G06F 3/0488* (2013.01); *G06K 9/6202* (2013.01); *G06T 7/11* (2017.01); *G06T 7/60* (2013.01); *G06T 7/62* (2017.01); *G06K 9/46* (2013.01); *G06T 2207/30242* (2013.01)

(58) Field of Classification Search
CPC ........ A01M 1/04; A01M 1/06; A01M 1/2011; A01M 1/24; A01M 31/002; A01M 2200/011; A01M 2200/012; G06K 9/46; G06K 9/6202; G06T 2207/30242; G06T 7/0004; G06T 7/11; G06T 7/60; G06T 7/62; G06T 7/70
See application file for complete search history.

(56) References Cited

U.S. PATENT DOCUMENTS

| | | | |
|---|---|---|---|
| 6,516,558 | B1 | 2/2003 | Lingren et al. |
| 7,401,436 | B2 | 7/2008 | Chyun |
| 7,496,228 | B2 | 2/2009 | Landwehr et al. |
| 7,916,951 | B2 | 3/2011 | Landwehr et al. |
| 8,139,858 | B1 | 3/2012 | Landwehr et al. |
| 8,365,995 | B2 | 2/2013 | Jiang et al. |
| 9,578,865 | B1 | 2/2017 | Lin |
| 9,877,487 | B2 * | 1/2018 | Nchekwube ......... A01N 25/006 |
| 2003/0026484 | A1 | 2/2003 | O'Neill |
| 2004/0140900 | A1 | 7/2004 | Barber et al. |
| 2005/0025357 | A1 | 2/2005 | Landwehr et al. |
| 2007/0169401 | A1 | 7/2007 | Chyun |
| 2007/0193109 | A1 | 8/2007 | Chyun |
| 2013/0223677 | A1 | 8/2013 | Ots |
| 2014/0053452 | A1 | 2/2014 | Hall, Jr. |
| 2014/0071276 | A1 | 3/2014 | Seifer et al. |
| 2014/0279600 | A1 | 9/2014 | Chait |
| 2015/0173338 | A1 | 6/2015 | McCammon et al. |
| 2016/0238737 | A1 | 8/2016 | Janet et al. |
| 2017/0231214 | A1 | 8/2017 | Vaisblat |
| 2017/0273290 | A1 | 9/2017 | Jay |
| 2017/0273291 | A1 | 9/2017 | Yoo et al. |
| 2018/0005076 | A1 | 1/2018 | Jain |
| 2018/0249696 | A1 | 9/2018 | Daly, Jr. et al. |

FOREIGN PATENT DOCUMENTS

| | | |
|---|---|---|
| CN | 102393920 A | 3/2012 |
| CN | 102648705 A | 8/2012 |
| CN | 202566059 U | 12/2012 |
| CN | 202873624 U | 4/2013 |
| CN | 103299969 A | 9/2013 |
| CN | 103749416 A | 4/2014 |
| CN | 103914733 A | 7/2014 |
| CN | 203748503 U | 8/2014 |
| CN | 203934551 U | 11/2014 |
| CN | 104186230 A | 12/2014 |
| EP | 2149301 A1 | 2/2010 |
| EP | 2627170 A1 | 8/2013 |
| JP | 2001045945 A | 2/2001 |
| JP | 2001069894 A | 3/2001 |
| JP | 2003169584 A | 6/2003 |
| JP | 2003304788 A | 10/2003 |
| JP | 2004261155 A | 9/2004 |
| JP | 2005021074 A | 1/2005 |
| JP | 2005237317 A | 9/2005 |
| JP | 3710111 B2 | 10/2005 |
| JP | 2006136276 A | 6/2006 |
| JP | 4200171 B2 | 12/2008 |
| JP | 2009011286 A | 1/2009 |
| JP | 2009106300 A | 5/2009 |
| JP | 2012019697 A | 2/2012 |
| JP | 2012161269 A | 8/2012 |
| KR | 1020150041241 A | 4/2015 |
| SI | 23715 A | 11/2012 |
| SI | 24220 A | 5/2014 |
| WO | 2012054990 A1 | 5/2012 |

OTHER PUBLICATIONS

O'Donovan, Google Technology is Helping Exterminators Kill Bugs Faster, BuzzFeed News, Tech Article, May 3, 2017, 4 pages.

"Glue Board Scanner—How Does It Work?," Alcochem Hygiene BV, Retrieved online from <http://www.glueboardscanner.com/wp/how-does-it-work/>, known to be publicly available at least as early as Jul. 22, 2015, 1 page.

"GlueBoardScanner," Alcochem Hygiene, Retrieved online from <http://www.alcochem.net/pages/glueboardscanner-32>, known to be publicly available at least as early as Jul. 22, 2015, 1 page.

Shimoda et al., "Automatic Pest Counting System Using Image Processing Technique," Journal of the Japanese Society of Agricultural Machinery, vol. 68, No. 3, 2006, pp. 59-64.

Bechar et al., "On-line counting of pests in a greenhouse using computer vision," in VAIB, 2010, 4 pages.

Salas et al., "Counting the Bumblebees Entering and Leaving a Beehive," in VAIB, 2012, 4 pages.

Bauch et al., "A prototype of a vision based system for measurements of white fly infestation," Acta horticulturae (ISHS), 0(691), Jan. 2005, pp. 773-780, Abstract Only.

Thompson, "Apps helping farmers identify unwanted pests," University of Georgia, College of Agricultural & Environmental Sciences, Media Newswire, Aug. 2, 2013, 2 pages.

Hopkins, "10 Best Mobile Agriculture Apps for 2012," Retrieved online from <http://www.croplife.com/editorial/10-warning-signs-your-website-is-grossly-outdated/>, Mar. 15, 2012, updated Mar. 25, 2013, 4 pages.

"Honey Bee Counter," Retrieved online from <http://www.instructables.com/id/Honey-Bee-Counter/>, 2012, 9 pages.

KreyoMET Trap, Kreyer, Retrieved online from <http://web.archive.org/web/20170318170355/http://kreyomet.com/index.php/en/products/trap>, archived Apr. 3, 2013, 2 pages.

"Pest Elimination—PestService Application Quick Start Guide," Ecolab, 2014, 13 pages.

"Pest Detection and Extraction Using Image Processing Techniques"; Johnny L. Miranda, Bobby D. Gerardo, and Bartolome T. Tanguilig III; International Journal of Computer and Communication Engineering, vol. 3, No. 3, May 2014 (Year: 2014).

EP Pat. App. No. 17776532.8, Extended European Search Report dated Aug. 6, 2019, 8 pages.

* cited by examiner

ANALYZING IMAGES OF PESTS USING A MOBILE DEVICE APPLICATION

CLAIM OF PRIORITY

This application is a continuation application of U.S. patent application Ser. No. 15/472,828 filed Mar. 29, 2017 and entitled "ANALYZING IMAGES OF PESTS USING A MOBILE DEVICE APPLICATION, which claims the benefit of U.S. Provisional Patent Application No. 62/314,644, filed on Mar. 29, 2016 and entitled, "SYSTEM AND METHODS FOR ANALYZING IMAGES OF PESTS USING A MOBILE DEVICE APPLICATION," the entire content of both of these applications are incorporated herein by reference in their entirety.

TECHNICAL FIELD

This disclosure generally relates to devices, systems, and methods for processing and analyzing images of pests using a mobile device application.

BACKGROUND

Pest elimination and reduction services use certain methods to keep track of pests and determine the extent of pest infestations. Such services often require pest concentrations to be monitored, tracked, and reported for each location serviced. Additionally, customers are increasingly demanding transparency of data on pest activities and better visualization and sharing of data. Currently, this requires individual service providers to manually count pests caught on glueboards and other insect trapping devices. This can be a time-intensive process and one that is subject to human error.

To better count and track pest catches on insect trapping devices, mobile devices and applications may be used to both automate time-intensive pest counting and automate the tracking process. It is difficult for computers to automatically determine pest type and quantity. The current invention establishes a solution to count type and amount of pests using glue boards, as well as to track and share information on pest count and size.

SUMMARY OF EXAMPLE EMBODIMENTS

Example 1 is a non-transitory computer readable medium with instructions stored thereon that, when executed by a processor of a mobile computing device, cause the mobile computing device to: receive, via a graphical user interface (GUI) of a mobile computing device, location information input corresponding to a location of a glueboard; receive, via the GUI, an identification input of a pest type caught on the glueboard; receive, via the GUI, an image of the glueboard; analyze white and dark areas of the image to determine at least one of: a) total dark surface area of the glueboard and b) number and size of multiple contiguous dark surface areas of the glueboard; calculate a quantity of pests based on dark surface area and an average size of the pest; and output, to the GUI, the quantity of pests.

In Example 2, the subject matter of Example 1 optionally includes wherein the instructions, when executed by a processor of the mobile computing device, further cause the mobile computing device to: request, via the GUI, a second identification input of a primary pest caught on the glueboard.

In Example 3, the subject matter of any one or more of Examples 1-2 optionally include wherein the instructions, when executed by a processor of the mobile computing device, further cause the mobile computing device to: request, via the GUI, an image of the glueboard.

In Example 4, the subject matter of any one or more of Examples 1-3 optionally include wherein the instructions, when executed by a processor of the mobile computing device, further cause the mobile computing device to: request at least one of: dimensions and model of the glueboard.

In Example 5, the subject matter of any one or more of Examples 1-4 optionally include wherein the quantity of pests is calculated by dividing the total dark surface area by a stored average size of the pest.

In Example 6, the subject matter of any one or more of Examples 1-5 optionally include wherein the quantity of pests is calculated by comparing sizes of contiguous dark surface areas to a stored average size of the pest.

In Example 7, the subject matter of any one or more of Examples 1-6 optionally include wherein the instructions, when executed by a processor of the mobile computing device, further cause the mobile computing device to: display an outline on the GUI reflecting the dimensions of the glueboard, the outline providing a visible contrast from the glueboard.

In Example 8, the subject matter of any one or more of Examples 1-7 optionally include wherein the instructions, when executed by a processor of the mobile computing device, further cause the mobile computing device to: analyze contiguous light areas of the glueboard to determine the dimensions of the glueboard.

Example 9 is a system, comprising: a glueboard; and a mobile computing device including a non-transitory computer readable medium with instructions stored thereon that, when executed by a processor of the mobile computing device, cause the mobile computing device to: receive, via a graphical user interface (GUI), location information input corresponding to a location of a glueboard; receive, via the GUI, an identification input of a pest type caught on the glueboard; receive, via the GUI, an image of the glueboard; analyze white and dark areas of the image to determine at least one of: a) total dark surface area of the glueboard and b) number and size of multiple contiguous dark surface areas of the glueboard; calculate a quantity of pests based on dark surface area and an average size of the pest; and output, to the GUI, the quantity of pests.

In Example 10, the subject matter of Example 9 optionally includes wherein the instructions, when executed by a processor of the mobile computing device, further cause the mobile computing device to: request, via the GUI, a second identification input of a primary pest caught on the glueboard.

In Example 11, the subject matter of any one or more of Examples 9-10 optionally include wherein the instructions, when executed by a processor of the mobile computing device, further cause the mobile computing device to: request, via the GUI, an image of the glueboard.

In Example 12, the subject matter of any one or more of Examples 9-11 optionally include wherein the instructions, when executed by a processor of the mobile computing device, further cause the mobile computing device to: request at least one of: dimensions and model of the glueboard.

In Example 13, the subject matter of any one or more of Examples 9-12 optionally include wherein the quantity of pests is calculated by dividing the total dark surface area by a stored average size of the pest.

In Example 14, the subject matter of any one or more of Examples 9-13 optionally include wherein the quantity of pests is calculated by comparing sizes of contiguous dark surface areas to a stored average size of the pest.

In Example 15, the subject matter of any one or more of Examples 9-14 optionally include wherein the instructions, when executed by a processor of the mobile computing device, further cause the mobile computing device to: display an outline on the GUI reflecting the dimensions of the glueboard, the outline providing a visible contrast from the glueboard.

In Example 16, the subject matter of any one or more of Examples 9-15 optionally include wherein the instructions, when executed by a processor of the mobile computing device, further cause the mobile computing device to: analyze contiguous light areas of the glueboard to determine the dimensions of the glueboard.

Example 17 is a method performed by a processor of a mobile computing device, the method comprising: receiving, via a graphical user interface (GUI) of a mobile computing device, location information input corresponding to a location of a glueboard; receiving, via the GUI, an identification input of a pest type caught on the glueboard; receiving, via the GUI, an image of the glueboard; analyzing white and dark areas of the image to determine at least one of: a) total dark surface area of the glueboard and b) number and size of multiple contiguous dark surface areas of the glueboard; calculating a quantity of pests based on dark surface area and an average size of the pest; and outputting, to the GUI, the quantity of pests.

In Example 18, the subject matter of Example 17 optionally includes requesting, via the GUI, a second identification input of a primary pest caught on the glueboard.

In Example 19, the subject matter of any one or more of Examples 17-18 optionally include requesting, via the GUI, an image of the glueboard.

In Example 20, the subject matter of any one or more of Examples 17-19 optionally include requesting at least one of: dimensions and model of the glueboard.

In Example 21, the subject matter of any one or more of Examples 17-20 optionally include wherein the quantity of pests is calculated by dividing the total dark surface area by a stored average size of the pest.

In Example 22, the subject matter of any one or more of Examples 17-21 optionally include wherein the quantity of pests is calculated by comparing sizes of contiguous dark surface areas to a stored average size of the pest.

In Example 23, the subject matter of any one or more of Examples 17-22 optionally include displaying an outline on the GUI reflecting the dimensions of the glueboard, the outline providing a visible contrast from the glueboard.

In Example 24, the subject matter of any one or more of Examples 17-23 optionally include analyzing contiguous light areas of the glueboard to determine the dimensions of the glueboard.

BRIEF DESCRIPTION OF THE DRAWINGS

The following drawings illustrate particular embodiments and therefore do not limit the scope of the invention. The drawings are intended for use in conjunction with the explanations in the following detailed description. Embodiments will hereinafter be described in conjunction with the appended drawings, wherein like numerals denote like elements.

DETAILED DESCRIPTION

The following detailed description is exemplary in nature and is not intended to limit the scope, applicability, or configuration of the invention in any way. Rather, the following description provides some practical illustrations for implementing exemplary embodiments. Examples are provided for selected elements, and all other elements employ that which is known to those of ordinary skill in the field of the invention. Those skilled in the art will recognize that many of the noted examples have a variety of suitable alternatives.

Figure 1:
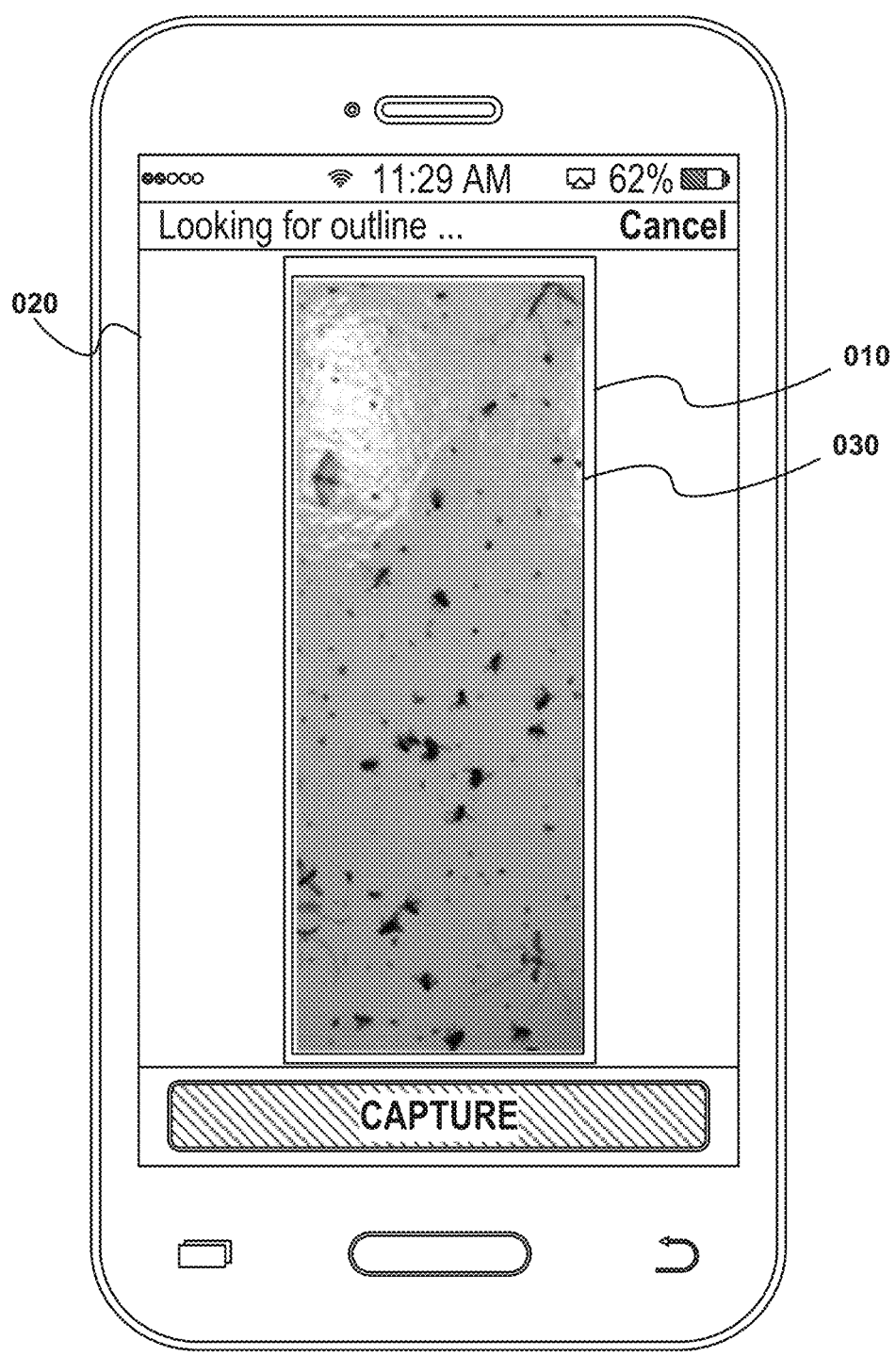
FIG. 1 is an example of a pest collection device.

FIG. 1 shows an embodiment of a pest trapping device 010 as seen from within mobile device application 020. In the present example, pest trapping device 010 consists of a white adhesive sheet, often referred to as a glue board. Insects and other pests can be caught on the adhesive. The white adhesive sheet may be contained within any pest trapping system, such as flying insect control lights and traps with replaceable glue boards.

Figure 2:
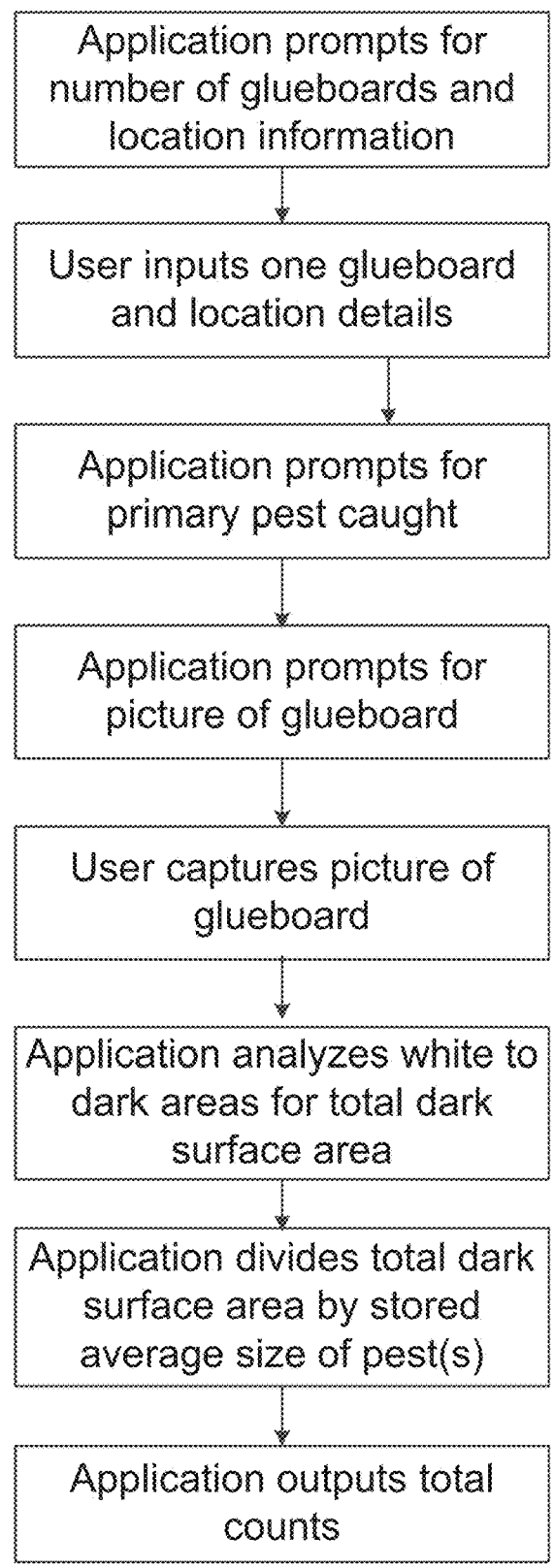
FIG. 2 is a flow diagram of a method for counting numbers and types of pests using a mobile application.
Figure 3:
FIG. 3 is an example of a message center in a mobile application.
Figure 4:
FIG. 4 is an example of a service schedule in a mobile application.
Figure 5:
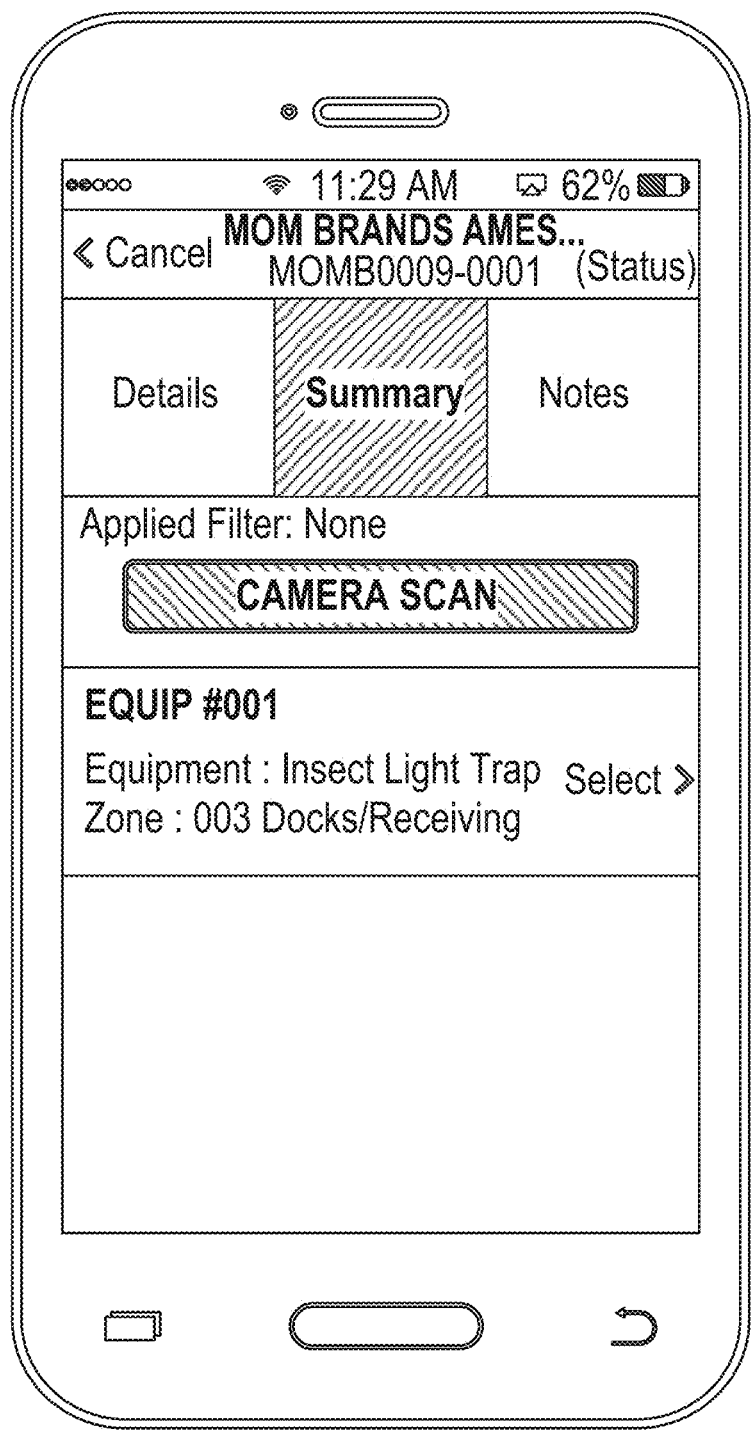
FIG. 5 is an example of a summary screen for a given location in a mobile application.
Figure 6:
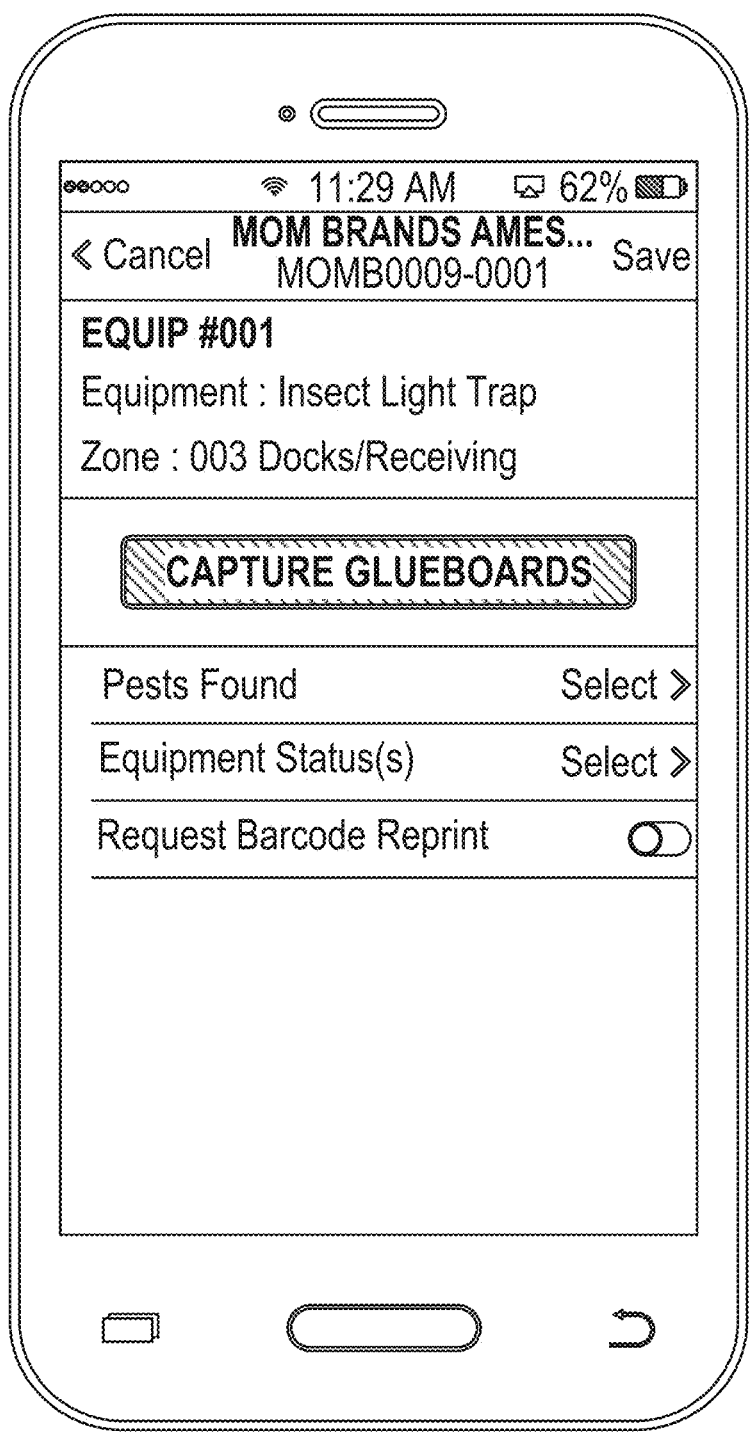
FIG. 6 is an example of a summary screen for a given piece of equipment in a mobile application.

FIG. 2 shows a flow diagram of an embodiment of the system. In this embodiment, a user may prompt mobile device application 020 to analyze pest trapping device 010 for a number of pests. In some embodiments, mobile device application 020 may consist of or be embedded within an application entitled "PestService app," available from the Assignee of the present application, and described, for instance, in a quick start guide entitled Pest Elimination PestService Application, the contents of which are hereby incorporated by reference in their entirety. Mobile device application 020 can prompt the user for the number of pest trapping devices 010 to analyze and the location that the pest trapping devices 010 were collected from. In other embodiments, the user may prompt mobile device application 020 to analyze pest trapping device 010 from within a service screen for a particular location and/or pest trapping device 010. Examples of such embodiments are shown in FIGS. 3, 4, 5, and 6. The user may navigate to a specific location through mobile device application 020, for example from a link within a message center displaying service visits in progress as shown in FIG. 3, or from a calendar of service visits as shown in FIG. 4. The user may then select the pest trapping device to be analyzed as shown in FIG. 5, and press a button from within that device's screen as shown in FIG. 6 to begin the pest analysis.

Figure 7:
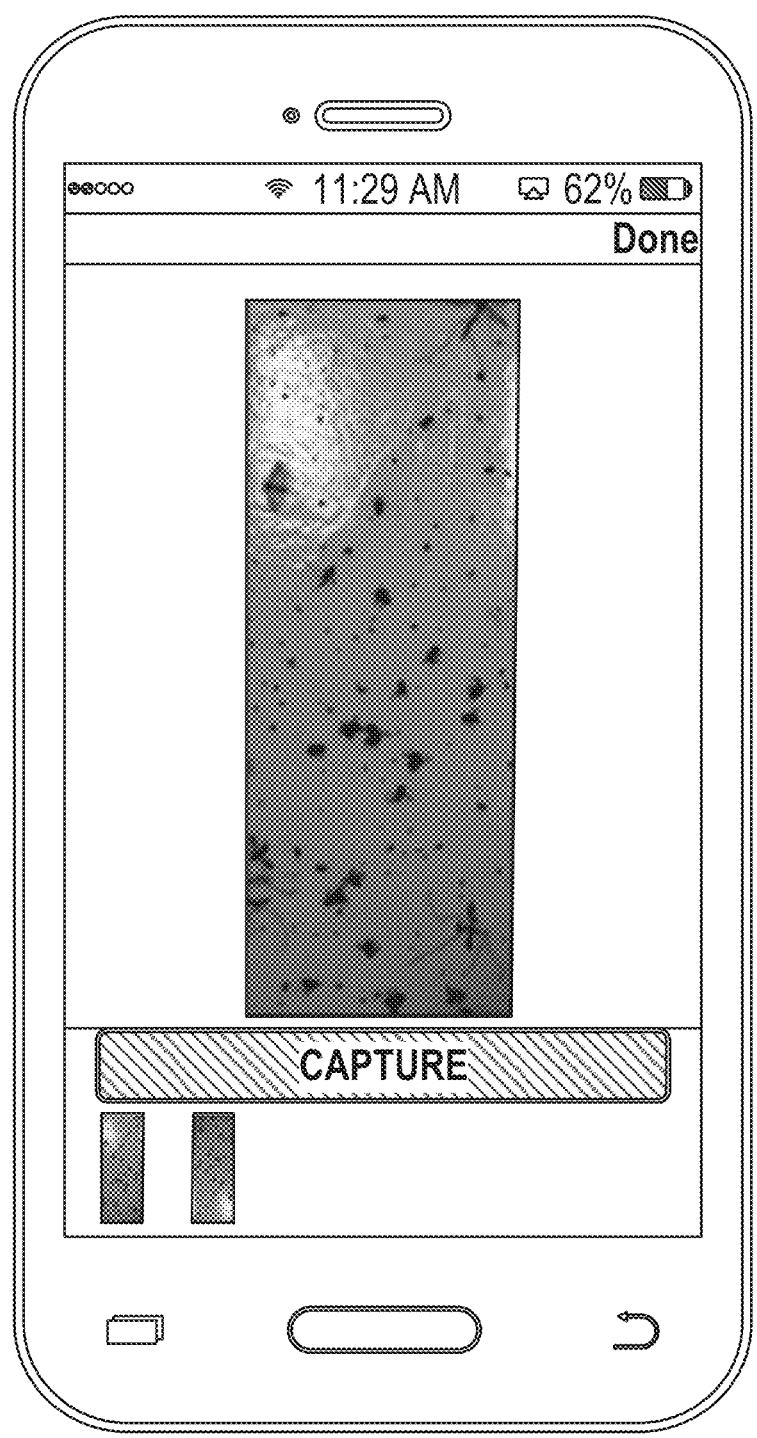
FIG. 7 is an example of a camera capture screen for capturing multiple images in a mobile application.

After mobile device application 020 determines the location and/or pest trapping device, mobile device application 020 can prompt the user for the type of pest to count. The user can enter one pest type or a combination of pest types. In some embodiments, mobile device application 020 can also prompt the user for the type or dimensions of insect trapping device 010. In some embodiments, mobile device application 020 can prompt the user for neither and instead automatically select the pest type and/or type or dimensions of insect trapping device 010. Mobile device application 020 can then prompt the user for image(s) of pest trapping device(s) 010. Mobile device application 020 can use the mobile device's camera to capture such images. Where multiple pest trapping devices 010 are indicated, mobile device application 020 can allow the user to capture and store multiple images, as shown in FIG. 7.

Mobile device application 020 processes images to select only the portion of the image that reflects pest trapping device 010. In some embodiments, shown in FIG. 1, mobile device application 020 can overlay an outline 030 with the dimensions of a given pest trapping device 010. The user can then manually line up outline 030 with the edges of pest trapping device 010. Upon image capture, mobile device application 020 can process only the portion of the image displayed within outline 030. In other embodiments, outline 030 may be displayed using different markers. For example, rather than a full outline, mobile device application 020 may display lines only at the corners, may overlay a semitransparent shape in the dimensions of the pest trapping device 010, or other markers intended to indicate pest trapping device 010's shape and dimensions.

Mobile device application 020 can determine the dimensions of outline 030 in various ways. In some embodiments, mobile device application 020 can do so by querying the user for the type or dimensions of pest trapping device 010, as discussed above. In other embodiments, mobile device application 020 can do so where users start pest analysis from within a given pest trapping device's 010 screen, as discussed above and shown in FIG. 6. In such cases, mobile device application 020 can determine dimensions of outline 030 by analyzing the type of pest trapping device 010 that the user accessed. In other embodiments, mobile device application 020 can estimate the dimensions of outline 030 by analyzing the image for contiguous light pixels in an outline configuration. In this embodiment, mobile device application 020 can display an estimated outline based on this analysis.

In some embodiments, mobile device application 020 can automatically determine the dimensions of pest trapping device 010 by analyzing the image for contiguous light pixels. In this embodiment, mobile device application 020 does not need to display outline 030, but instead can determine dimensions automatically and integrate them into later analysis without user input.

In some embodiments, mobile device application 020 can be calibrated before or during the image-taking process. Calibration can be manual or automatic. Calibration can include determination of a scaling factor to enable the user to take pictures of pest trapping device 010 from various distances. Calibration can also include a tool to ensure that the camera is properly focused.

Upon uploading pictures, mobile device application 020 analyzes the images based on the contrast between pest trapping device 010 and the pests caught and the size of the pest(s). In some embodiments, mobile device application 020 determines the number contiguous dark pixels on pest trapping device 010. It can then use known shapes and size limits of pests to determine which contiguous pixel areas may represent which pests, and complete a count of each type of pest.

In other embodiments, mobile device application 020 determines the number of dark pixels on pest trapping device 010 to obtain a total surface area of dark pixels. Where the user indicated a single pest, mobile device application 020 divides the dark pixel surface area by a known average pest size to determine the approximate number of the indicated pest. Where the user indicates a combination of pests, mobile device application 020 divides the dark pixel surface area by the average of all pests indicated to determine the approximate number of total pests.

Figure 8A:
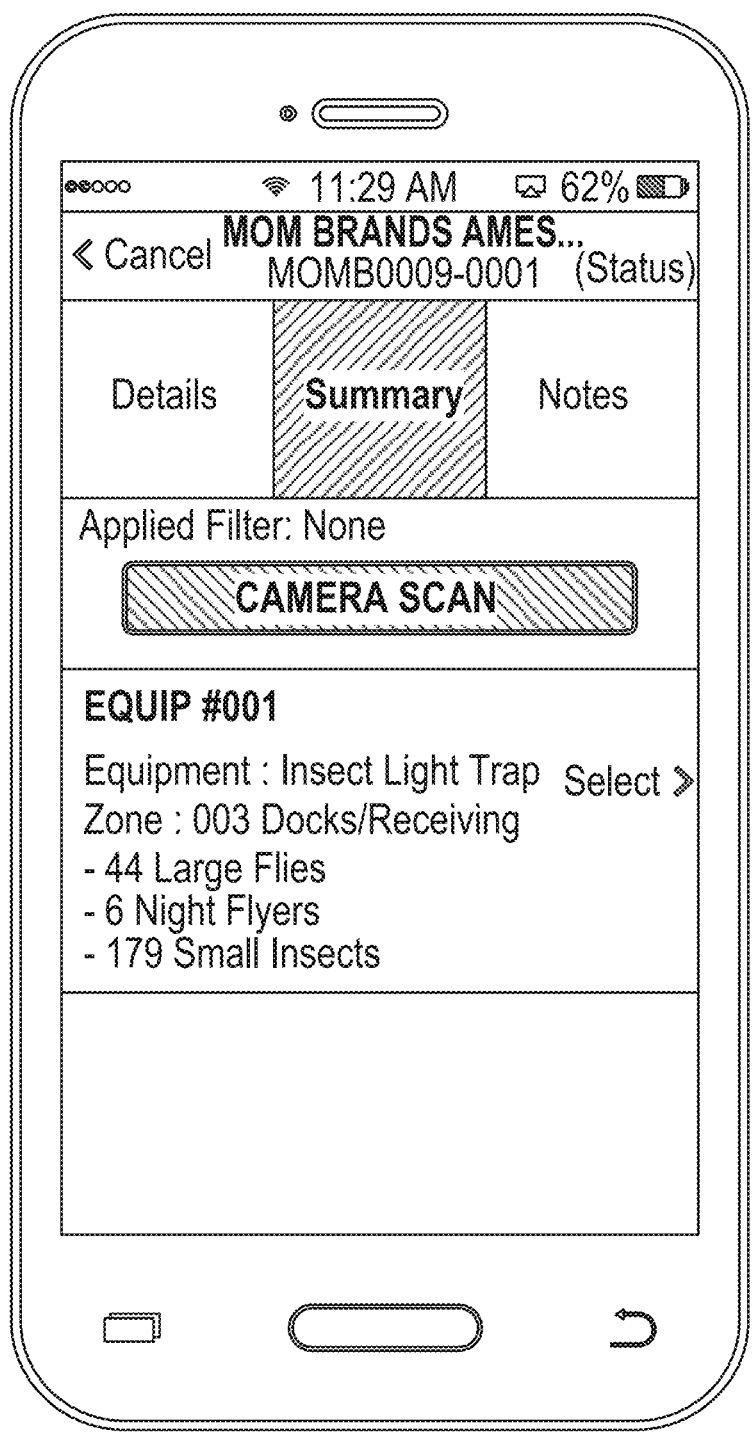
FIG. 8A is an example of output from pest count findings in a mobile application.
Figure 8B:
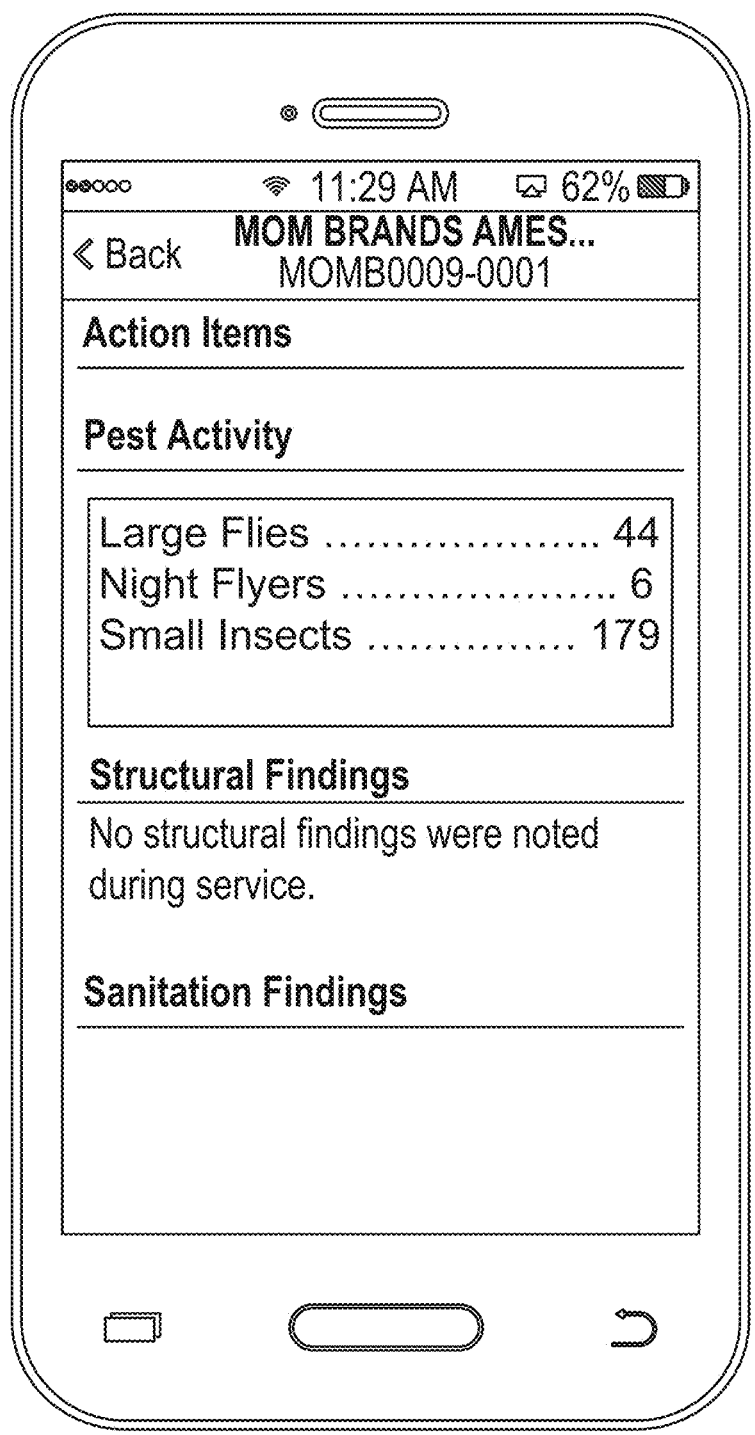
FIG. 8B is an example of an output report of pest count findings in a mobile application.
Figure 9:
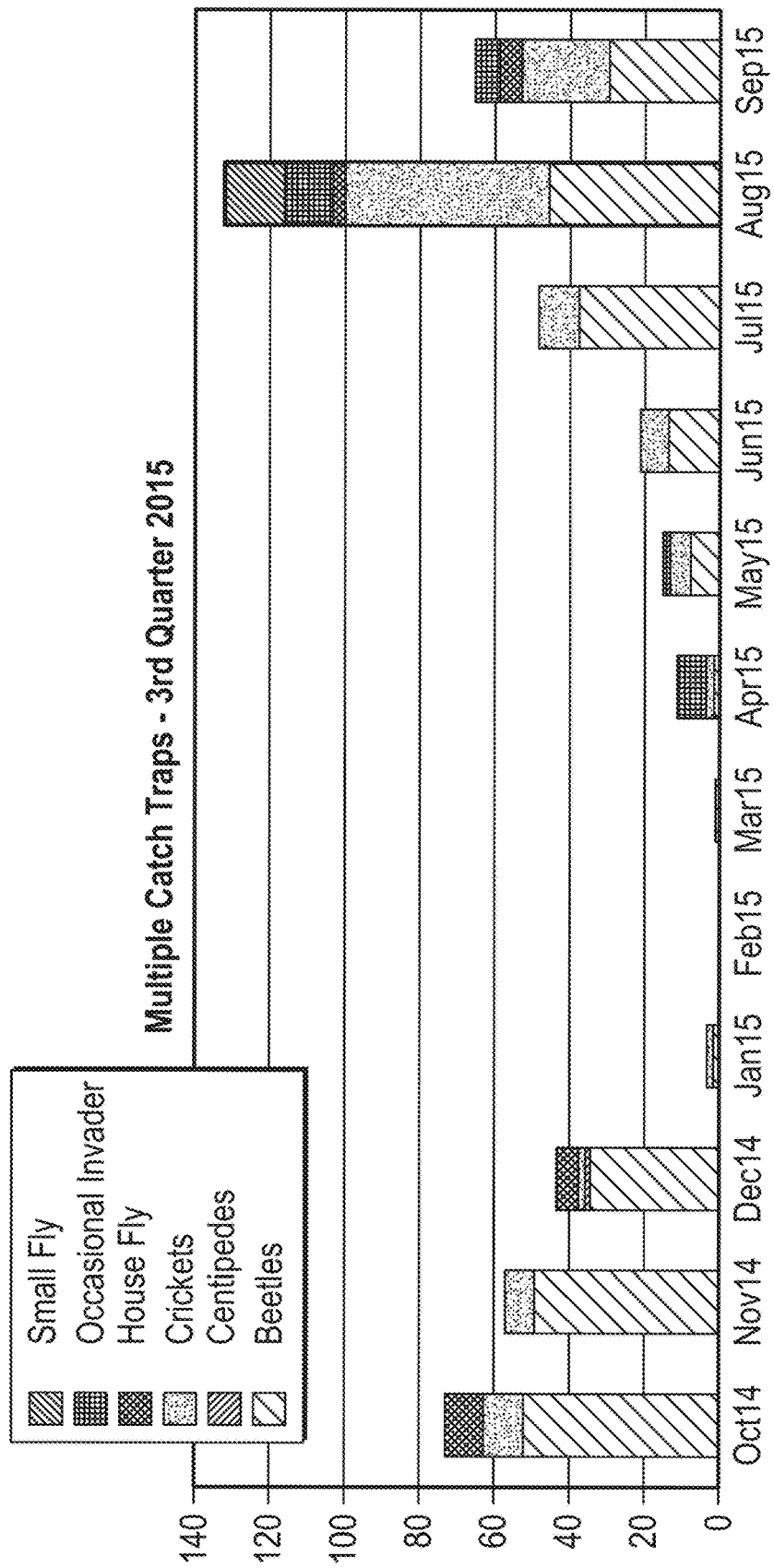
FIG. 9 is an example of a report of pests found over time using stored information from pest counts.

Upon calculating the number and type of pests, mobile device application 020 outputs the result to the user. The output may be used in various ways. For example, the output stored in the summary section of a service visit as shown in FIG. 8A and used in summary reports as shown in FIG. 8B. The output may also be stored and used in later reports, for example to report pests caught over time to customers as shown in FIG. 9.

Figure 10:
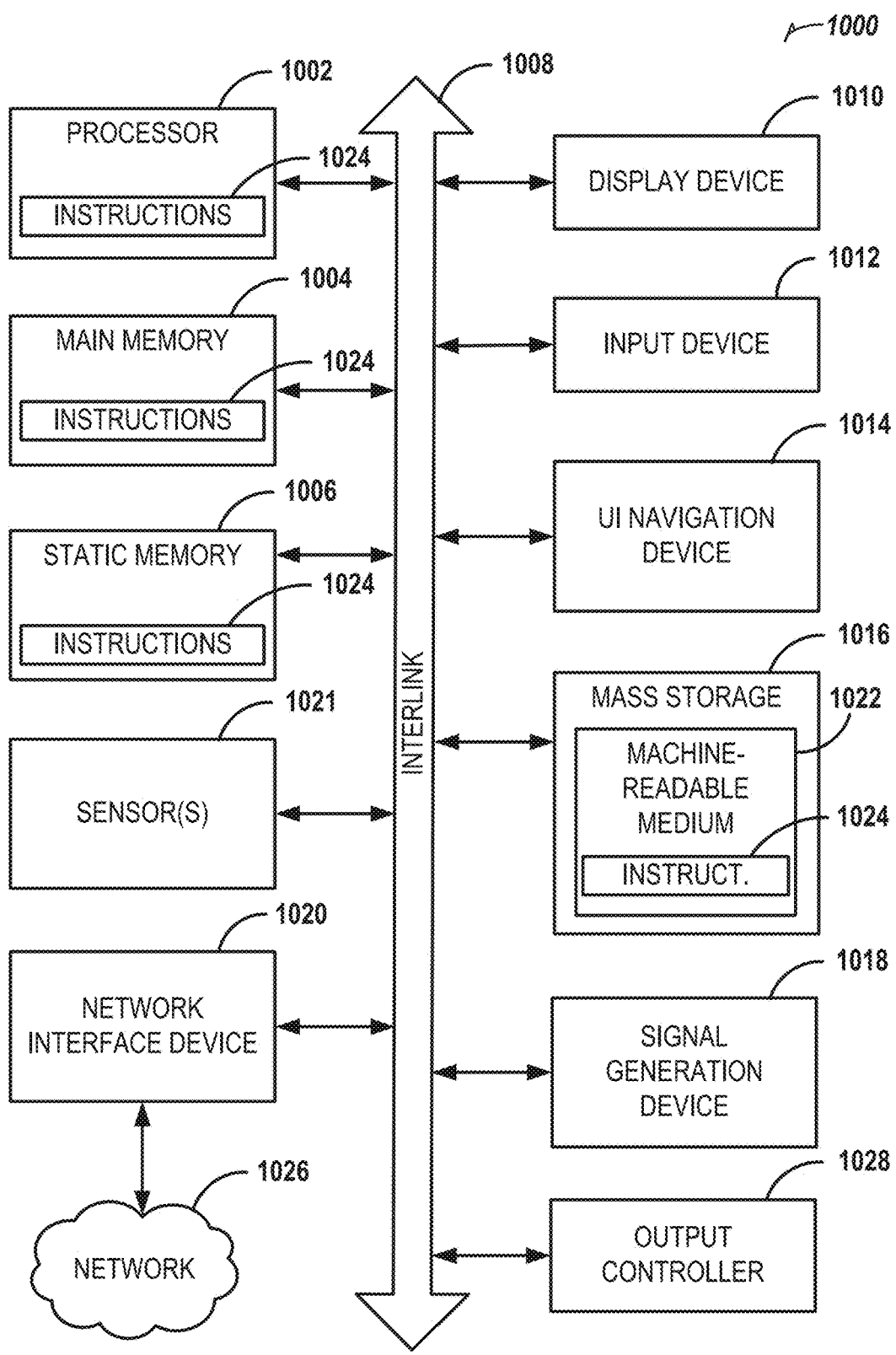
FIG. 10 is a block diagram illustrating an example of a machine, upon which any one or more example embodiments may be implemented.

FIG. 10 is a block diagram illustrating an example of a machine 1000, upon which any one or more example embodiments may be implemented. In alternative embodiments, the machine 1000 may operate as a standalone device or may be connected (e.g., networked) to other machines. In a networked deployment, the machine 1000 may operate in the capacity of a server machine, a client machine, or both in a client-server network environment. In an example, the machine 1000 may act as a peer machine in a peer-to-peer (P2P) (or other distributed) network environment. The machine 1000 may implement or include any portion of the systems, devices, or methods illustrated in FIGS. 1-10, and may be a computer, a server, or any machine capable of executing instructions (sequential or otherwise) that specify actions to be taken by that machine. Further, although only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations, etc.

Examples, as described herein, may include, or may operate by, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 1000 may include a hardware processor 1002 (e.g., a central processing unit (CPU), a graphics processing unit (GPU), a hardware processor core, or any combination thereof), a main memory 1004 and a static memory 1006, some or all of which may communicate with each other via an interlink (e.g., bus) 1008. The machine 1000 may further include a display unit 1010, an alphanumeric input device 1012 (e.g., a keyboard), and a user interface (UI) navigation device 1014 (e.g., a mouse). In an example, the display unit 1010, input device 1012 and UI navigation device 1014 may be a touch screen display. The machine 1000 may additionally include a storage device (e.g., drive unit) 1016, a signal generation device 1018 (e.g., a speaker), a network interface device 1020, and one or more sensors 1021, such as a global positioning system (GPS) sensor, compass, accelerometer, or other sensor. The machine 1000 may include an output controller 1028, such as a serial (e.g., USB, parallel, or other wired or wireless (e.g., infrared (IR), near field communication (NFC), etc.) connection to communicate or control one or more peripheral devices (e.g., a printer, card reader, etc.)

The storage device 1016 may include a machine-readable medium 1022 on which is stored one or more sets of data structures or instructions 1024 (e.g., software) embodying or utilized by any one or more of the techniques or functions described herein. The instructions 1024 may also reside, completely or at least partially, within the main memory 1004, within static memory 1006, or within the hardware processor 1002 during execution thereof by the machine 1000. In an example, one or any combination of the hardware processor 1002, the main memory 1004, the static memory 1006, or the storage device 1016 may constitute machine-readable media.

Although the machine-readable medium 1022 is illustrated as a single medium, the term "machine-readable medium" may include a single medium or multiple media (e.g., a centralized or distributed database, and/or associated caches and servers) configured to store the one or more instructions 1024.

The term "machine-readable medium" may include any medium that is capable of storing, encoding, or carrying instructions for execution by the machine 1000 and that cause the machine 1000 to perform any one or more of the techniques of the present disclosure, or that is capable of storing, encoding or carrying data structures used by or associated with such instructions. Non-limiting machine-readable medium examples may include solid-state memories, and optical and magnetic media. Accordingly, machine-readable media are not transitory propagating signals. Specific examples of machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks.

The instructions 1024 may further be transmitted or received over a communications network 1026 using a transmission medium via the network interface device 1020 utilizing any one of a number of transfer protocols (e.g., frame relay, Internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMAX®), IEEE 802.15.4 family of standards, Bluetooth®, Bluetooth® low energy technology, ZigBee®, peer-to-peer (P2P) networks, among others. In an example, the network interface device 1020 may include one or more physical jacks (e.g., Ethernet, coaxial, or phone jacks) or one or more antennas to connect to the communications network 1026. In an example, the network interface device 1020 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1000, and includes digital or analog communications signals or other intangible medium to facilitate communication of such software.

Various examples have been described. These and other examples are within the scope of claims to be provided in one or more subsequent applications.

What is claimed is:

1. A non-transitory computer-readable medium with instructions stored thereon that, when executed by a processor of a computing device, cause the computing device to:
   receive, via a graphical user interface (GUI), an identification input of a pest type caught on the glueboard;
   receive, via the GUI, an image of the glueboard;
   analyze white and dark areas of the image of the glueboard to determine a dark surface area;
   calculate a quantity of pests based on the dark surface area and a stored average size of the identified pest type caught on the glueboard; and
   output, to the GUI, the calculated quantity of pests.

2. The non-transitory computer-readable medium of claim 1, wherein the instructions, when executed by a processor of the computing device, further cause the computing device to:
   request, via the GUI, a second identification input of a primary pest type caught on the glueboard.

3. The non-transitory computer-readable medium of claim 1, wherein the instructions, when executed by a processor of the computing device, further cause the computing device to:
   request, via the GUI, an image of the glueboard.

4. The non-transitory computer-readable medium of claim 1, wherein the instructions, when executed by a processor of the computing device, further cause the computing device to:
   request at least one of: dimensions and model of the glueboard.

5. The non-transitory computer-readable medium of claim 1, wherein the quantity of pests is calculated by dividing the total dark surface area by the average size of the pest type caught on the glueboard.

6. The non-transitory computer-readable medium of claim 1, wherein the quantity of pests is calculated by comparing sizes of contiguous dark surface areas to the average size of the pest type caught on the glueboard.

7. The non-transitory computer-readable medium of claim 1, wherein the instructions, when executed by a processor of the computing device, further cause the computing device to:
display an outline on the GUI reflecting the dimensions of the glueboard, the outline providing a visible contrast from the glueboard.

8. The non-transitory computer-readable medium of claim 1, wherein the instructions, when executed by a processor of the computing device, further cause the computing device to:
analyze contiguous light areas of the glueboard to determine the dimensions of the glueboard.

9. A system, comprising:
a glueboard; and
a computing device including a non-transitory computer-readable medium with instructions stored thereon that, when executed by a processor of the computing device, cause the computing device to:
receive, via a graphical user interface (GUI), an identification input of a pest type caught on the glueboard;
receive, via the GUI, an image of the glueboard;
analyze white and dark areas of the image of the glueboard to determine a dark surface area;
calculate a quantity of pests based on the dark surface area and a stored average size of the identified pest type caught on the glueboard; and
output, to the GUI, the calculated quantity of pests.

10. The system of claim 9, wherein the instructions, when executed by a processor of the computing device, further cause the computing device to:
request, via the GUI, a second identification input of a primary pest type caught on the glueboard.

11. The system of claim 9, wherein the instructions, when executed by a processor of the computing device, further cause the computing device to:
request, via the GUI, an image of the glueboard.

12. The system of claim 9, wherein the instructions, when executed by a processor of the computing device, further cause the computing device to:
request at least one of: dimensions and model of the glueboard.

13. The system of claim 9, wherein the quantity of pests is calculated by dividing the total dark surface area by the average size of the pest type caught on the glueboard.

14. The system of claim 9, wherein the quantity of pests is calculated by comparing sizes of contiguous dark surface areas to the average size of the pest type caught on the glueboard.

15. The system of claim 9, wherein the instructions, when executed by a processor of the computing device, further cause the computing device to:
display an outline on the GUI reflecting the dimensions of the glueboard, the outline providing a visible contrast from the glueboard.

16. The system of claim 9, wherein the instructions, when executed by a processor of the computing device, further cause the computing device to:
analyze contiguous light areas of the glueboard to determine the dimensions of the glueboard.

17. A method performed by a processor of a computing device, the method comprising:
receiving, via a graphical user interface (GUI) of a computing device, an identification input of a pest type caught on the glueboard;
receiving, via the GUI, an image of the glueboard;
analyzing white and dark areas of the image of the glueboard to determine a dark surface area;
determining a quantity of pests based on the dark surface area and a stored average size of the identified pest type caught on the glueboard type; and
outputting, to the GUI, the determined quantity of pests.

18. The method of claim 17, further comprising:
requesting, via the GUI, a second identification input of a primary pest type caught on the glueboard.

19. The method of claim 17, further comprising:
requesting, via the GUI, an image of the glueboard.

20. The method of claim 17, further comprising:
requesting at least one of: dimensions and model of the glueboard.

21. The method of claim 17, wherein the quantity of pests type caught on the glueboard is calculated by dividing the total dark surface area by the average size of the pest.

22. The method of claim 17, wherein the quantity of pests is calculated by comparing sizes of contiguous dark surface areas to the average size of the pest type caught on the glueboard.

23. The method of claim 17, further comprising:
displaying an outline on the GUI reflecting the dimensions of the glueboard, the outline providing a visible contrast from the glueboard.

24. The method of claim 17, further comprising:
analyzing contiguous light areas of the glueboard to determine the dimensions of the glueboard.

25. The method of claim 17, wherein the computing device is a mobile computing device.

26. The method of claim 17, further comprising receiving, via the GUI of the mobile computing device, location information input corresponding to a location of a glueboard.

27. The method of claim 17, wherein analyzing the white and dark areas of the image of the glueboard to determine the dark surface area comprises using at least one of (1) the total dark surface area of the glueboard; and (2) the size of multiple contiguous dark surface areas of the glueboard.

28. The non-transitory computer-readable medium of claim 1, wherein the instructions are executed by a processor of a mobile computing device.

29. The non-transitory computer-readable medium of claim 1, wherein the instructions, when executed by a processor of the computing device, further cause the computing device to:
receive, via the GUI, location information input corresponding to a location of the glueboard.

30. The non-transitory computer-readable medium of claim 1, wherein:
analyzing the white and dark areas of the image of the glueboard to determine the dark surface area comprises using at least one of (1) the total dark surface area of the glueboard; and (2) the size of multiple contiguous dark surface areas of the glueboard.

31. The system of claim 9, wherein the computing device is a mobile computing device.

32. The system of claim 9, wherein the instructions, when executed by a processor of the computing device, further cause the computing device to:

receive, via a graphical user interface (GUI), location information input corresponding to a location of a glueboard.

33. The system of claim 9, wherein analyzing the white and dark areas of the image of the glueboard to determine the dark surface area comprises using at least one of (1) the total dark surface area of the glueboard; and (2) the size of multiple contiguous dark surface areas of the glueboard.

\* \* \* \* \*

UNITED STATES PATENT AND TRADEMARK OFFICE
CERTIFICATE OF CORRECTION

PATENT NO. : 10,636,163 B2  
APPLICATION NO. : 16/505656  
DATED : April 28, 2020  
INVENTOR(S) : Jared R. Freudenberg, Christopher D. Diller and Kevin S. Smyth Page 1 of 1

It is certified that error appears in the above-identified patent and that said Letters Patent is hereby corrected as shown below:

In the Claims

In Column 10, Claim 17, Line 14, delete "type".

In Column 10, Claim 21, Line 25, delete "type caught on the glueboard".

In Column 10, Claim 21, Line 26, delete "pest." and insert -- pest type caught on the glueboard. --.

Signed and Sealed this  
Twenty-ninth Day of September, 2020

Andrei Iancu  
*Director of the United States Patent and Trademark Office*